United States Patent [19]

Barth et al.

[11] Patent Number: 4,904,978

[45] Date of Patent: Feb. 27, 1990

[54] MECHANICAL SENSOR FOR HIGH TEMPERATURE ENVIRONMENTS

[75] Inventors: Phillip W. Barth, Palo Alto; Kurt E. Petersen, San Jose, both of Calif.

[73] Assignee: Solartron Electronics, Inc., Oxnard, Calif.

[21] Appl. No.: 187,687

[22] Filed: Apr. 29, 1988

[51] Int. Cl.[4] .......................... H01C 10/10; G01L 1/22
[52] U.S. Cl. ............................................ 338/47; 338/4
[58] Field of Search .......................................... 338/2–5, 338/47; 29/610 SG

[56] References Cited

U.S. PATENT DOCUMENTS

| | | | |
|---|---|---|---|
| 3,800,264 | 3/1974 | Kurtz et al. | 338/2 |
| 3,930,823 | 1/1976 | Kurtz et al. | 65/33 |
| 4,400,869 | 8/1983 | Wilner et al. | 29/576 C |
| 4,406,992 | 9/1983 | Kurtz et al. | 338/2 |
| 4,456,901 | 6/1984 | Kurtz et al. | 338/4 |
| 4,510,671 | 4/1985 | Kurtz et al. | 29/571 |
| 4,523,964 | 6/1985 | Wilner et al. | 148/33.2 |
| 4,592,238 | 6/1986 | Busta | 73/727 |
| 4,605,919 | 8/1986 | Wilner | 338/2 |
| 4,649,627 | 3/1987 | Abernathey et al. | 29/571 |

OTHER PUBLICATIONS

Angell, James B. et al., "Silicon Micromechanical Devices," *Scientific American* (Apr. 1983), 248(4): 44–55.
Lasky, J. B. et al., "Silicon-on-Insulator (SOI) by Bonding and Etch-Back," *IEDM 85* (1985), pp. 684–687.
Poff, Ronald I., "Stable Miniature Pressure Transducer Using Inorganic Bonding Construction," ISA, 1987-Paper #87-0250, pp. 373–382.

*Primary Examiner*—Teresa J. Walberg
*Assistant Examiner*—M. M. Lateef
*Attorney, Agent, or Firm*—Sanford J. Asman; Brian D. Stoole; Robert C. Colwell

[57] ABSTRACT

A force or pressure sensor includes a monocrystalline silicon diaphragm coated with silicon dioxide upon which single crystalline silicon resistors are fused in a low profile pattern on the surface. The resistors are almost perfectly electrically isolated from each other and from the underlying silicon substrate. The structure is fabricated by forming resistors in a first wafer and then affixing that surface of the first wafer to the silicon dioxide layer on the second wafer. All of the first wafer except for the resistors has been removed, and metal contact capable of resisting elevated temperatures are formed to provide electrical connections to the resistors.

11 Claims, 3 Drawing Sheets

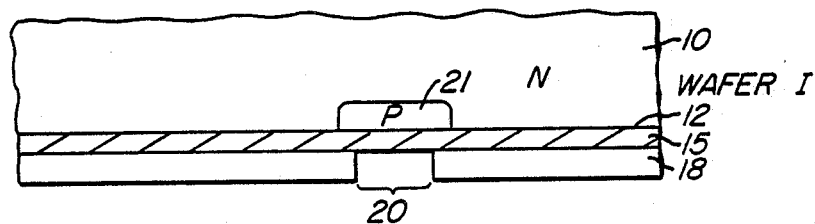
FIG._1.
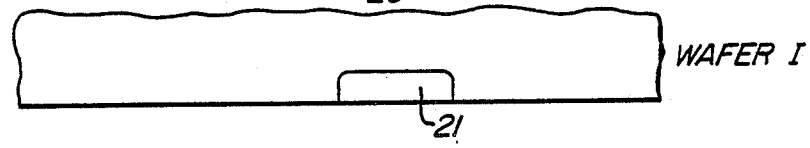
FIG._2.
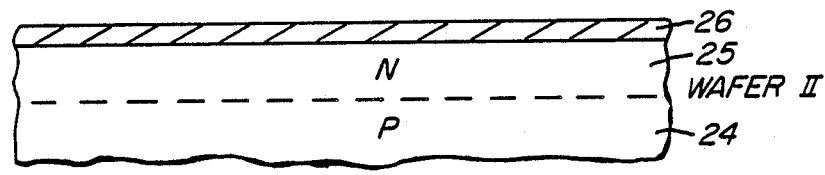
FIG._3.
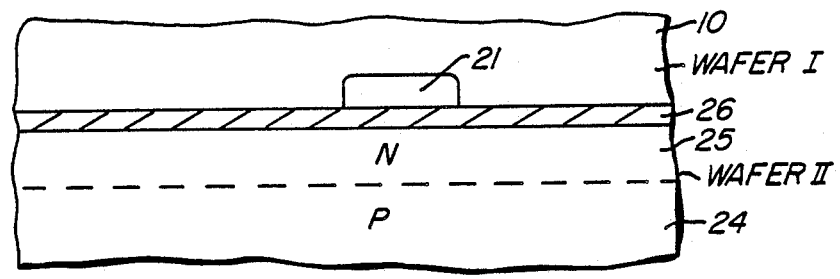
FIG._4.
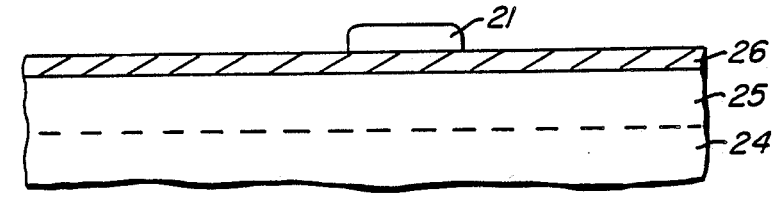
FIG._5.
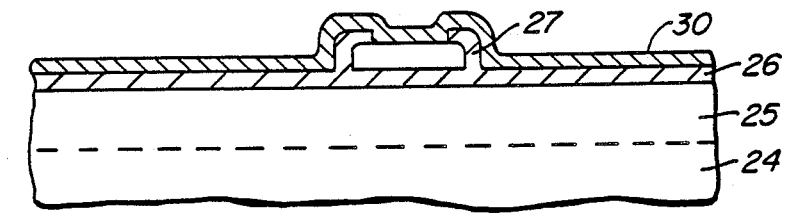
FIG._6.

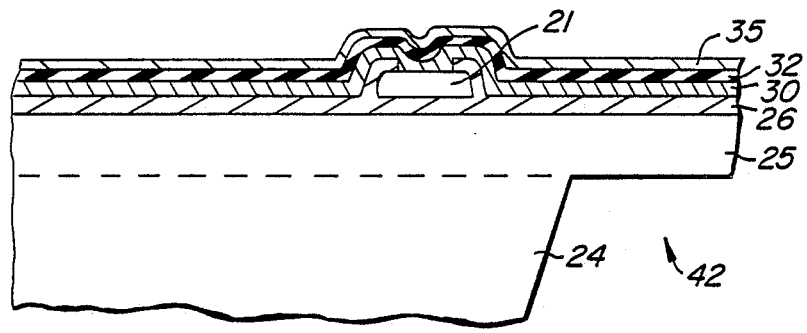
FIG._7.
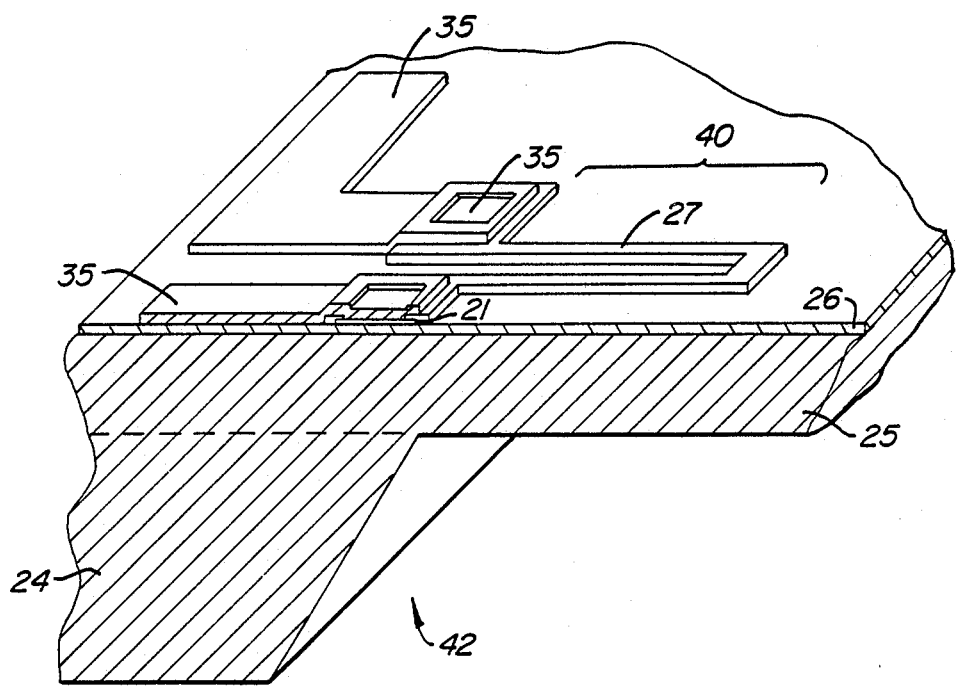
FIG._8.

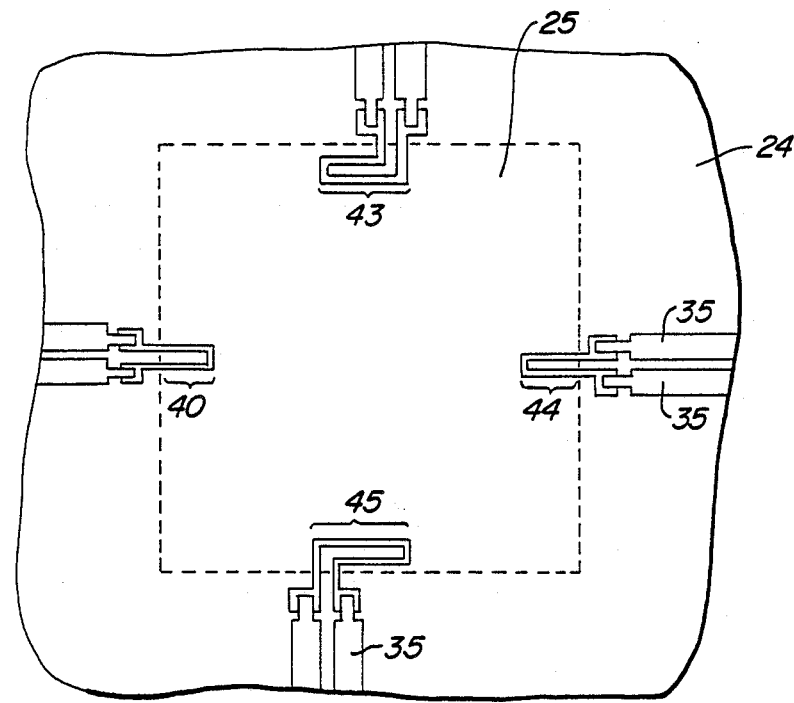
FIG._9.

MECHANICAL SENSOR FOR HIGH TEMPERATURE ENVIRONMENTS

BACKGROUND OF THE INVENTION

1. Field of the Invention

This invention relates to pressure sensors, and in particular, to pressure sensors suitable for use in high temperature environments, for example, on the order of 250° C. to 300° C.

2. Description of the Prior Art

Many micromechanical devices are now well known. Such devices include sensors of all types, for example, for sensing force, pressure, acceleration, chemical concentration, etc. These devices are termed "micromechanical" because of their small dimensions—on the order of a few millimeters square. The small size is achieved by employing photolithographic technology similar to that employed in the fabrications of integrated circuits. With this technology, the devices are almost as small as microelectronic circuits, and many such devices are fabricated in a batch on a single wafer or other substrate, thereby spreading the cost of processing that wafer among many individual devices. The resulting low cost and excellent performance enormously increases the applications for such devices. In addition, by forming such devices on a semiconductor substrate such as a silicon wafer, associated control and/or sensing circuitry may be formed on the same substrate during the same processes, thereby further increasing density and reducing cost.

At lease two types of silicon micromechanical pressure sensors are well known. For example, silicon capacitive and piezoresistive pressure sensors are described in "Silicon Micromechanical Devices," *Scientific American* (April 1983) 248(4):44-55, by Angel, Terry and Barth, one of the inventors herein. In capacitive silicon pressure sensors, a thin flexible diaphragm acts as one plate of a variable air gap capacitor. In piezoresistive sensors, electrical resistors are formed on or near the flexible diaphragm of a sensor, and change resistance when the diaphragm flexes. In the prior art, resistors in piezoresistive pressure sensors are formed by doping areas of the diaphragm and then providing electrical connections to the doped areas. When the diaphragm is flexed, mechanical stress in the resistors changes their electrical resistance. By placing four resistors in a Wheatstone bridge configuration, flexing of the diaphragm increases the resistance of two resistors and decreases the resistance of two resistors, thereby making the bridge more sensitive to pressure changes than if it were fabricated with a single resistor.

The resistors in such conventional silicon-based pressure sensors typically are formed by diffusing or ion-implanting a suitable impurity into the surface of the diaphragm region. For example, by implanting P-type impurity into an N-type diaphragm, the resistors are electrically isolated from each other by the resulting PN junctions. Unfortunately, the effectiveness of the PN junctions decreases as the temperature of the sensor increases. Above about 125° C.–175° C. the junctions are isolated so ineffectively because of junction leakage effects that it is difficult to obtain a reliable measurement of the resistances, thereby destroying the reliability of pressure measurements relying upon those resistance changes. The diffused resistors also suffer from the disadvantage that changes in PN junction depletion region width can change their resistance.

In an effort to increase the temperature capability of silicon pressure sensors, various resistor isolation techniques have been used. In one approach, rather than employing diffused resistors, deposited polycrystalline silicon resistors are employed. Unfortunately, the polycrystalline silicon does not have the same high value of piezoresistance coefficient as the single crystal silicon, thereby degrading the accuracy of pressure measurements. Additionally, monocrystalline silicon resistors are desirable because the polycrystalline resistors are not equally sensitive in all directions, and the grain boundaries are susceptible to stress problems at high temperatures.

Another approach has been to employ single crystal silicon resistors deposited on a glass layer or which are chemically affixed to the substrate, for example, using an organic bonding agent. Unfortunately, the glass and most organic agents soften at relatively low temperatures, and processes employing organic bonding are time consuming and expensive, resulting in resistors which protrude high above the surface of the diaphragm. The high resistors enhance the difficulty of effectively coupling the stresses from the diaphragm into the resistors. Furthermore, the glass or organic adhesives contain contaminants which can ruin other circuitry formed on the same die.

Another prior art technique has been to embed single crystal silicon resistors in a polycrystalline silicon substrate using a dielectric isolation process. Unfortunately, this technique means that the stresstransmitting membrane is not single crystal silicon, and is therefore subject to the undesirable mechanical properties of polycrystalline silicon.

Still another approach has been to form epitaxial silicon resistors on sapphire substrates. Unfortunately, sapphire is an expensive material which is difficult to machine into the complex geometries preferred for solid state pressure sensors.

References typifying the above techniques, as well as other approaches, are included in an accompanying disclosure statement.

SUMMARY OF THE INVENTION

The pressure sensor of our invention provides a single crystal silicon diaphragm coated with an insulator which has single crystal silicon resistors fused onto the insulator in a low profile pattern. The single crystal silicon resistors are nearly perfectly electrically isolated from each other and from the underlying silicon substrate. Metal connections resistant to high temperature provide connections to the resistors.

In a preferred embodiment the pressure sensor includes a base having an opening therein, a diaphragm integrally affixed to the base and disposed over the opening, and a layer of silicon dioxide disposed on the diaphragm. Each monocrystalline silicon resistive region is disposed on the diaphragm and extends from a first contact location to a remote location and returns to a second contact location which is spaced apart from the first contact location. Separate electrical connections are provided to the resistive region at each of the contact locations.

The pressure sensor is fabricated by defining heavily doped P-type resistors adjacent one surface of a first N-type silicon wafer. This surface of the first wafer then is fused to a silicon dioxide layer formed atop a second wafer. Next, all of the first wafer is removed except the P-type resistor regions, thereby resulting in monocrystalline silicon resistors on the silicon dioxide isolation layer on the second wafer. The resistors are oxidized and contact openings defined, then a high temperature resistant multi-layer metal system is deposited to provide electrical interconnections.

In a preferred embodiment, the process of fabricating a pressure sensor includes the steps of forming a silicon dioxide layer on a diaphragm, forming a doped region adjacent to a top surface of a wafer, and bonding the top surface of the wafer to the silicon dioxide layer to thereby join the diaphragm to the wafer. Next, a step is performed in which all of the wafer is removed except for the doped region, to thereby define the resistors. This process is followed by the formation of high temperature resistant electrical connections to the doped region.

BRIEF DESCRIPTION OF THE DRAWINGS

FIG. 1 is a cross-sectional view of a first wafer in which a region has been formed.

FIG. 2 is a subsequent cross section after removal of masking oxide layers.

FIG. 3 is a cross-sectional view of a second wafer having an epitaxial layer and a layer of silicon dioxide.

FIG. 4 is a cross-sectional view of the wafers of FIGS. 2 and 3 after being fused together.

FIG. 5 is a subsequent cross-sectional view after removal of all of the first wafer except the resistive region.

FIG. 6 is a subsequent cross-sectional view after formation of a contact opening and deposition of a first layer of metal.

FIG. 7 subsequent cross-sectional view after deposition layers.

FIG. 8 is a perspective view of the completed structure.

FIG. 9 is a top view of the completed structure.

DETAILED DESCRIPTION OF THE PREFERRED EMBODIMENTS

FIG. 1 is a cross-sectional view of a portion of a first monocrystalline silicon wafer 10 of desired thickness and crystalline orientation. Across a desired surface 12 a layer of silicon dioxide 15 is formed, preferably by heating the wafer in an oxidizing ambient in a well known manner to create a layer of silicon dioxide approximately 500 to 3,000 Angstroms thick. On silicon dioxide 15, a layer of photoresist 18 is formed, and an opening 20 defined therein using well known photolithographic techniques. Opening 20, shown in cross section in FIG. 1, will have a configuration corresponding to the desired planform of the monocrystalline silicon resistor and contact pads in the to-be-formed pressure sensor. Typically, at least four resistors will be defined for each pressure sensor in the wafer. Many force or pressure sensors—usually hundreds—will be formed from the die of the wafer. Next, using well known techniques, boron, or other desired P-conductivity type impurity, is introduced into wafer 10 to define the resistors and contact pads 21. For the structure shown in FIG. 1, ion-implantation technology is employed to create a P-type region having an impurity concentration of 1 to $2 \times 10^{20}$ atoms per cubic centimeter. In an alternative technique, the opening 20 in photoresist 18 is used to define a further opening in silicon dioxide 15 to allow diffusion of resistor 21.

The doping level for the P-type resistor is not critical, and is constrained by the desired resistance as well as the amount of boron necessary for the P-type region to function as a silicon etch stop in a later step. After formation of the resistor 21, the photoresist 18 and silicon dioxide 15 are removed using well known techniques, thereby resulting in the structure shown in FIG. 2.

FIG. 3 is a cross-sectional view of a second wafer having a P-conductivity type substrate 24 upon which an N-conductivity type epitaxial layer 25 is formed. The fabrication of epitaxial layer 25 is achieved using well known semiconductor process technology. The thickness of the epitaxial layer will correspond to the thickness of the diaphragm of the pressure sensor, and in the preferred embodiment is 5 to 200 microns. The particular thickness will depend upon the application and desired sensitivity of the pressure sensor. A layer of silicon dioxide 26 approximately 500 to 10,000 Angstroms thick is formed on the surface of epitaxial layer 25. In alternative embodiments discussed further below, epitaxial layer 25 is omitted or doped with the same conductivity impurity as the substrate.

As next depicted in FIG. 4, the two wafers are cleaned and fused together with the resistive region 21 being disposed directly on silicon dioxide layer 26. Fusion bonding is achieved by pressing the two wafers together and then heating the assembly to a high temperature, typically on the order of 700° C. or higher in an oxidizing atmosphere, and holding them at that temperature for about 60 minutes. This silicon-silicon dioxide bonding may be achieved using a variety of well known techniques, for example, as described by J. B. Lasky, et al., "Silicon-on-Insulator (SOI) by Bonding and Etch-Back," *International Electron Devices Meeting 1985*, CH2252-5/85/0000 -0684 IEEE, pp. 684–687. The result is an integral assembly as depicted in FIG. 4.

Next, as shown in FIG. 5, all of wafer I is removed except the doped resistor and contact pads. In the preferred embodiment this is achieved by a combination of grinding, polishing, and etching to remove all of the substrate except the P-type region 21. The grinding and polishing steps are carried out using conventional commercially-available equipment. Once the bulk of wafer I has been removed, the final etching step employs a silicon etchant such as ethylene-diamine, pyrocatechol, and water. This mixture does not attack silicon which has been heavily doped with boron, thereby resulting in complete removal of the first wafer except for the resistor regions. The appearance of the structure after removal of wafer I is shown in FIG. 5. The rounded profile of the resistor upper surface is advantageous as it provides improved metal coverage.

Next, the assembly is reoxidized to form silicon dioxide 27 extending over the resistive regions 21. Using well known photolithographic technology, contact holes are defined and etched through this new oxide 27 to the contact pads in the P-type resistor regions. (The location of the contact pads is shown in more detail in FIGS. 8 and 9.) Once the contact openings are completed, metal interconnecting lines may be deposited and etched. For example, FIG. 6 shows the appearance of the wafer after deposition of a first metal layer 30, but before patterning of that layer.

While many metallization systems may be employed for pressure sensors operating at low temperatures, in the preferred embodiment we employ a special metallization system which enables the pressure sensor to be subjected to very high temperatures. In the preferred embodiment the first metal layer 30 comprises a cosputtered layer of tungsten and titanium approximately 500–2,500 Angstroms thick. The tungsten/titanium mixture provides excellent adhesion and electrical contact to the resistor contact 21.

As next shown by FIG. 7, on top of tungsten/titanium layer 30, a layer of tungsten/titanium nitride 32 is deposited. Layer 32 is achieved by bleeding nitrogen into the vacuum chamber in which the sputtering operation is performed. The nitrogen reacts with titanium and tungsten to form titanium and tungsten nitride. In the preferred embodiment the nitride layer 32 will be approximately 1,000–2,000 Angstroms thick. The titanium and tungsten nitride layer 32 functions as a diffusion barrier for the deposition of a thin gold layer 35 approximately 3,000 to 10,000 Angstroms thick on the upper surface of the nitride. The nitride prevents the gold from diffusing downward through the metallization which would result in loss of adhesion, alloying of the gold with silicon, and other undesirable effects. The metallization system is advantageous as it provides excellent electrical conductivity, good adhesion, and a diffusion barrier. Of course, other systems could be employed depending on the expected operating temperature for the sensor.

After the metallization system is complete, again using well known photolithographic techniques, the metal is defined into a desired contact pattern as shown in FIG. 8. That FIGURE shows the upper layer of gold 35 extending out to a pair of contact pads overlying region 21. A serpentine resistor 40 extends between the contact pads. Depending upon the application for which the sensor is intended, the resistors and contact pads will be disposed over the diaphragm, the base, or both.

After definition of the metal connecting lines, again using well known photolithographic techniques, a cavity 42 is etched from the backside of the wafer to remove the substrate 24 from beneath the diaphragm 25 in the desired area. If the epitaxial layer is N-conductivity type and the substrate P-conductivity type, then this cavity may be etched using published electrochemical silicon etching procedures. If the epitaxial layer is omitted, or doped to match the substrate, then a timed etching procedure may be employed to produce a diaphragm of desired thickness. The front surface of the wafer may be protected from the etchant in any of several ways, such as by use of deposited layers of silicon dioxide or silicon nitride, by coating the surface with wax, by attaching a glass plate to the surface using wax or epoxy or silicon rubber, or by using mechanical clamping and elastomeric sealing rings to seal the front surface away from the etch.

The geometry of cavity 42 may take any of several desired forms, depending upon the specific application and pressure range. In the preferred embodiment a square or rectangular cavity is used, as shown in FIG. 9. As shown there, the diaphragm 25 has four resistors 40, 43, 44, and 45, one positioned on each side of the diaphragm. A series of metal connections 35 extend to each resistor.

It should be appreciated that the configuration of the resistors and metal regions shown in FIG. 9 are only illustrative. Also depending upon the application, the configuration of the pressure sensor may be in any desired shape.

The preceding has been a description of the preferred embodiments of the force or pressure transducer of our invention, as well as the techniques for fabricating it. While the preferred embodiment is a pressure or force sensor, it should be understood that the geometrical configuration of the cavity formed in base layer 24, and the diaphragm or flexing layer 25 may be varied to achieve sensor structures which convert various other mechanical inputs such as acceleration, tactile input, displacement or others to an appropriate force to form a transducer for such mechanical variables. It should be appreciated that numerous details have been included in the description for clarity and illustration. The scope of our invention is set forth in the appended claims.

We claim:

1. A sensor comprising:
   a base having an opening therein;
   a flexing layer connected to the base and disposed over the opening;
   a first layer of insulator disposed on the flexing layer;
   a monocrystalline silicon resistive region deposited on the first layer;
   a second layer of electrically-insulating material disposed over the resistive region; and
   electrical connections to the resistive region at at least a first and second contact location.

2. A sensor as in claim 1 wherein each of the base and the flexing layer comprise monocrystalline silicon.

3. A sensor as in claim 2 wherein the second layer comprises silicon dioxide.

4. A sensor as in claim 1 wherein each of the separate electrical connections comprise a metal.

5. A sensor as in claim 4 wherein the metal comprises a mixture of titanium and tungsten.

6. A sensor as in claim 5 wherein each of the electrical connections further comprises a layer of titanium nitride and tungsten nitride overlying the mixture.

7. A sensor as in claim 6 wherein each of the electrical connections further comprises a layer of gold overlying the nitride.

8. A sensor as in claim 1 wherein the resistive region comprises at least one loop-shaped region.

9. A sensor as in claim 8 wherein the loop-shaped region is doped with P-conductivity type impurity.

10. A sensor for use at high temperatures comprising:
    a monocrystalline silicon base having an opening therethrough;
    an epitaxial silicon layer disposed over the opening and the base to thereby provide a pressure sensitive diaphragm or flexing layer;
    a first layer of silicon dioxide disposed on the epitaxial layer;
    a monocrystalline silicon resistor disposed on the first layer over the opening and extending to a first and a second contact region over the base;
    a second layer of silicon dioxide disposed over all of the resistor except the contact regions; and
    a first and second metal contacts disposed on the first layer and extending to the respective first and second contact regions to thereby provide electrical connections to the resistor.

11. A sensor as in claim 10 wherein each of the first and second contacts comprise:
    an underlying region of a mixture of titanium and tungsten;
    a barrier layer of titanium nitride disposed over the underlying region; and
    a gold layer disposed on the barrier layer.

* * * * *